UNITED STATES PATENT OFFICE.

JOHANN BAPTIST OTTO SUIDTER, OF LUCERNE, SWITZERLAND.

LUSTROUS PAINT.

SPECIFICATION forming part of Letters Patent No. 565,147, dated August 4, 1896.

Application filed March 30, 1896. Serial No. 585,474. (No specimens.)

*To all whom it may concern:*

Be it known that I, JOHANN BAPTIST OTTO SUIDTER, chemist, of Lucerne, Switzerland, have invented a certain new and useful Method of or Proceeding for Obtaining Lustrous Paint, of which the following is a specification.

The purpose of the invention is to obtain very great brilliancy in pictures of any kind, such as oil-aquarelle paintings, drawings, photographs, and the like, by preparing according to my improvement either the ground or surface upon which the picture is drawn or painted, or the colors with which such pictures are executed.

A further object of my invention is to provide a prepared ground or surface for oil-paintings that absorbs rapidly the oil contained in the colors without diminishing the intensity of each color, this allowing the artist to apply his colors in a more continuous manner than is possible in oil-painting on the linen, wood, or cardboard prepared for that purpose in the well-known manner.

The proceeding consists of mixing with the usual substances forming either the ground color applied on the paper, linen, wood, cardboard, or other article to be painted or drawn, or the color or colors with which such painting or drawing is to be effected, finely-pulverized silicious sinter, (quartz or opal,) which imparts to the said ground color or other colors certain reflecting qualities which they no not possess without it, and at the same time the ground color so composed is better able to absorb the oil of oil colors applied upon it. The mixture of the said porous substance with the colors may take place in any suitable way and in any desired proportions. A suitable mixture for the same will be, for instance, one hundred poise units of silicious sinter and ten poise units of chalk. The said substance will be first pulverized and sifted and then mixed with four hundred poise units of water. The mixture is then combined with a solution of twenty-five poise units of glue and twenty poise units of honey dissolved in five hundred poise units of water. The whole is then heated until it presents paste consistence and is applied hot upon the surface which is to be painted, (paper, linen, &c.,) or it is mixed with the usual oil or aquarelle colors which are intended to be used for painting the picture. In both cases the painting thus prepared has great brilliancy without the use of varnish.

Having thus fully described my invention, I claim—

The herein-described improvement in preparing surfaces for pictures, consisting in coating such surface with a mixture containing finely-pulverized silicious sinter, chalk, glue, honey and water, for increasing the brilliancy of the picture and absorbing the oily or aqueous materials in the colors as the picture is painted, substantially as specified.

In testimony whereof I have signed my name to this specification in the presence of two subscribing witnesses.

JOHANN BAPTIST OTTO SUIDTER.

Witnesses:
ULRIC FREY,
ERNEST WILLIAMS.